United States Patent [19]
Arai et al.

[11] Patent Number: 6,118,774
[45] Date of Patent: Sep. 12, 2000

[54] INFORMATION SIGNAL COMMUNICATING APPARATUS METHOD AND SYSTEM

[75] Inventors: Hideyuki Arai, Kawasaki; Masamine Maedda, Chiba, both of Japan

[73] Assignee: Canon Kabushiki Kaisha, Tokyo, Japan

[21] Appl. No.: 08/934,567

[22] Filed: Sep. 22, 1997

[30] Foreign Application Priority Data

Sep. 25, 1996 [JP] Japan ................................. 8-252950

[51] Int. Cl.⁷ ........................................... H04B 7/216
[52] U.S. Cl. .................... 370/342; 370/204; 370/335; 370/333; 375/200; 375/206
[58] Field of Search .................................. 370/335, 333, 370/342, 203, 204, 320, 441; 375/200, 206

[56] References Cited

U.S. PATENT DOCUMENTS

| | | | |
|---|---|---|---|
| 5,103,459 | 4/1992 | Gilhousen et al. | 370/209 |
| 5,418,815 | 5/1995 | Ishikawa et al. | 375/216 |
| 5,781,542 | 7/1998 | Tanaka et al. | 370/342 |
| 5,870,378 | 2/1999 | Huang et al. | 370/209 |
| 5,930,230 | 7/1999 | Odenwalder et al. | 370/208 |
| 5,930,706 | 7/1999 | Raith | 455/422 |
| 5,949,814 | 9/1999 | Odenwalder et al. | 375/200 |

FOREIGN PATENT DOCUMENTS

| | | |
|---|---|---|
| 0 112 666 | 7/1984 | European Pat. Off. . |
| 0 809 373 | 11/1997 | European Pat. Off. . |
| 0 837 566 | 4/1998 | European Pat. Off. . |
| 0 887 948 | 12/1998 | European Pat. Off. . |
| 8-163085 | 6/1996 | Japan . |
| WO 94/11955 | 5/1994 | WIPO . |

*Primary Examiner*—Hassan Kizou
*Assistant Examiner*—Saba Tsegaye
*Attorney, Agent, or Firm*—Fitzpatrick, Cella, Harper & Scinto

[57] ABSTRACT

A communicating apparatus which received a signal transmitted from external equipment detects a transmitting situation of a transmission path by an error state of the reception signal. The communicating apparatus controls a modulating process of an information signal which is transmitted in accordance with the transmitting situation detected by the error state. Thus, the modulating process of the transmission signal is controlled in accordance with an environment of the transmission path and a process such that a transmission error rate and an information amount are optimum can be realized.

39 Claims, 6 Drawing Sheets

INFORMATION SIGNAL COMMUNICATING APPARATUS METHOD AND SYSTEM

BACKGROUND OF THE INVENTION

1. Field of the Invention

The invention relates to information signal communicating apparatus, method, and system and, more particularly, to a modulating process of an information signal which is transmitted through a transmission path.

2. Related Background Art

Generally, in a spread spectrum communication by the direct spread system, a spread modulation is performed to an information signal (baseband signal) to be transmitted by using a spread code series such as a pseudo noise code (PN code) or the like, thereby forming a spread modulation signal of a band width that is extremely wider than that of the baseband signal. The spread modulation signal is further converted into a radio frequency (RF) signal by using a PSK (phase shift keying), FSK (frequency shift keying), or the like and is transmitted to the reception side.

On the reception side, the received RF signal is demodulated to the spread modulation signal before transmission. Subsequently, the reception side obtains a correlation with the spread modulation signal by using the spread code series used on the transmission side (namely, a reverse spread modulating process is performed) and converts the spread modulation signal to the baseband signal before transmission.

According to such a spread spectrum modulation system, a band width of the transmission signal is extremely wider than that of an information signal. Therefore, under a condition such that the band width of the transmission path is constant, an amount of information to be transmitted is fairly smaller than that of the conventional radio communication system and only a low transmission speed can be realized.

As a method of solving the above problem, there is a method called a code division multiplex. According to this method, the information signal to be transmitted is divided into a plurality of parallel data and each data is spread modulated by a plurality of different spread code series. Subsequently, those spread modulation data is multiplexed and is converted into the RF signal and is transmitted. By using this method, a high speed data transmission can be realized even under a condition such that the band width of the transmission path is constant.

However, the above code division multiplex has the following problems. For example, as the multiplex number increases in order to transmit a larger amount of information, a phenomenon called a multipath fading is likely to occur. According to such a phenomenon, when a direct wave and a reflection wave whose phase differs from that of the direct wave are interfered, an electric power level of the reception signal deteriorates. Due to an influence by such a phenomenon, when the multiplex number is increased, an amount of errors which are caused in the transmission signal increases, so that there is a problem such that a communication fault or a communication stop occurs.

Further, under an environment of the transmission path such that noises which are mixed into the transmission signal change with the elapse of time, it is necessary to set the multiplex number in accordance with the environment of the transmission path. However, since it is difficult to detect the noises which are mixed during the communication, it is very difficult to control the information amount in accordance with the environment of the transmission path.

SUMMARY OF THE INVENTION

An object of the present invention is to solve the above-described problems.

Another object of the invention is to provide an information signal communicating apparatus in which, by controlling a modulating process of a transmission signal in accordance with an environment of a transmission path, a process such as to make a transmission error rate and an information amount optimum is realized.

As one preferred embodiment under such objects, according to the invention, there is provided an information signal communicating apparatus comprising: (a) receiving means for receiving a signal transmitted from an outside; (b) detecting means for detecting an error state of the reception signal received by the receiving means; (c) modulating means for modulating an information signal in accordance with a detection result of the detecting means; and (d) output means for outputting the information signal modulated by the modulating means.

According to another embodiment of the invention, there is provided an information signal communicating apparatus comprising: (a) receiving means for receiving a signal to which an error detection code is added; (b) detecting means for detecting an error rate of the signal received by the receiving means by using the error detection code; (c) modulating means for modulating an information signal; and (d) control means for controlling a modulating process of the modulating means in accordance with a detection result of the detecting means.

According to still another embodiment of the invention, there is provided an information signal communicating apparatus comprising: (a) modulating means for modulating an information signal; (b) output means for outputting the information signal modulated by the modulating means; (c) receiving means for receiving external error information; and (d) control means for controlling a modulating process of the modulating means in accordance with the error information received by the receiving means.

According to further another embodiment of the invention, there is provided an information signal communicating apparatus comprising: (a) dividing means for dividing an inputted information signal into one or more data trains; (b) forming means for forming one or more different code series; (c) modulating means for modulating each of the one or more data trains by using the one or more different code trains; (d) detecting means for detecting a transmitting situation by an error state of a signal which was transmitted in the past; and (e) control means for controlling the number of divisions of the dividing means in accordance with a detection result of the detecting means.

Further another object of the invention is to provide an information signal communicating apparatus in which an information signal which was modulated such as to make a transmission error rate and an information amount optimum in accordance with an environment of a transmission path can be received.

As one preferred embodiment under such an object, according to the present invention, there is provided an information signal communicating apparatus comprising: (a) receiving means for receiving an information signal which was modulation processed in accordance with an error state of a signal which was transmitted in the past; (b) discriminating means for discriminating the modulating process of the information signal received by the receiving means; and (c) demodulating means for demodulating the information signal in accordance with a discrimination result of the discriminating means.

Further another object of the invention is to provide an information signal communication system in which by controlling a modulating process of a transmission signal in accordance with an environment of a transmission path, a process such as to make a transmission error rate and an information signal optimum is realized.

As one preferred embodiment under such an object, according to the invention, there is provided an information signal communication system comprising: (a) receiving means for receiving a signal transmitted from an outside; (b) detecting means for detecting an error state of the signal received by the receiving means; (c) transmitting means for transmitting error information indicative of the error state detected by the detecting means; and (d) modulating means for modulating an information signal in accordance with the error information transmitted by the transmitting means.

Further another object of the invention is to provide an information signal communicating method whereby by controlling a modulating process of a transmission signal in accordance with an environment of a transmission path, a process such as to make a transmission error rate and an information amount optimum is realized.

As one preferred embodiment under such an object, according to the invention, there is provided an information signal communicating method comprising: (a) a receiving step of receiving a signal transmitted from an outside; (b) a detecting step of detecting an error state of the reception signal received in the receiving step; (c) a modulating step of modulating an information signal in accordance with a detection result obtained in the detecting step; and (d) an output step of outputting the information signal modulated in the modulating step.

According to further another embodiment of the invention, there is provided an information signal communicating method comprising: (a) a receiving step of receiving a signal to which an error detection code is added; (b) a detecting step of detecting an error rate of the signal received in the receiving step by using the error detection code; (c) a modulating step of modulating an information signal; and (d) a control step of controlling a modulating process in the modulating step in accordance with a detection result obtained in the detecting step.

According to further another embodiment of the invention, there is provided an information signal communicating method comprising: (a) a modulating step of modulating an information signal; (b) an output step of outputting an information signal modulated in the modulating step; (c) a receiving step of receiving external error information; and (d) control means for controlling a modulating process in the modulating step in accordance with error information received in the receiving step.

According to further another embodiment of the invention, there is provided an information signal communicating method comprising: (a) a dividing step of dividing an inputted information signal into one or more data trains; (b) a forming step of forming one or more different code series; (c) a modulating step of modulating each of the one or more data trains by using the one or more different code series; (d) a detecting step of detecting a transmitting situation by an error state of a signal which was transmitted in the past; and (e) a control step of controlling the number of divisions in the dividing step in accordance with a detection result obtained in the detecting step.

Further another object of the invention is to provide an information signal communicating method whereby an information signal which was modulated such that a transmission error rate and an information amount are made optimum in accordance with an environment of a transmission path can be received.

As one preferred embodiment under such an object, according to the invention, there is provided an information signal communicating method comprising: (a) a receiving step of receiving an information signal which was modulation processed in accordance with an error state of a signal which was transmitted in the past; (b) a discriminating step of discriminating the modulating process of the information signal received in the receiving step; and (c) a demodulating step of demodulating the information signal in accordance with a discrimination result obtained in the discriminating step.

Still other objects of the present invention, and the advantages thereof, will become fully apparent from the following detailed description of the embodiments.

DETAILED DESCRIPTION OF THE PREFERRED EMBODIMENTS

The preferred embodiments of the present invention will be described in detail hereinafter with reference to the accompanying drawings.
(First embodiment)

Figure 1:
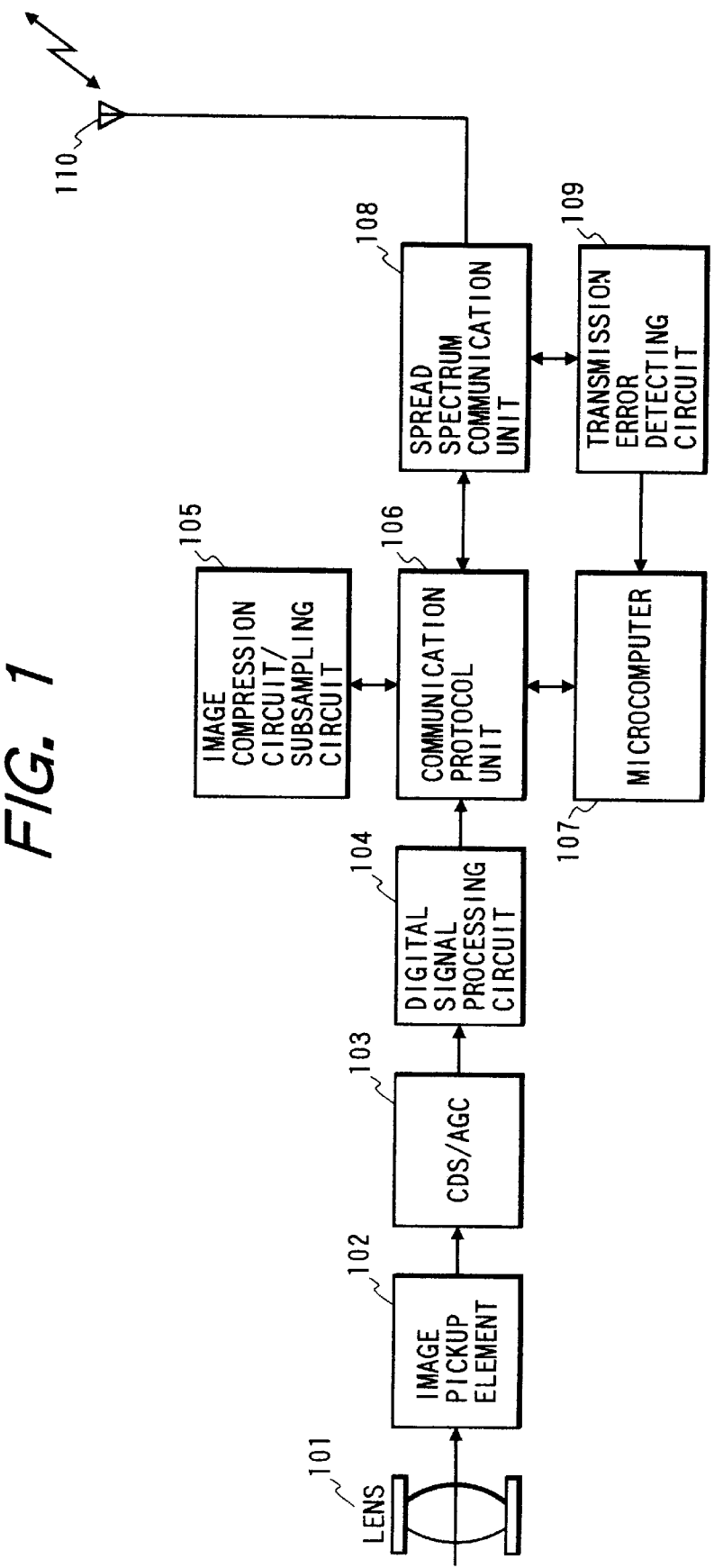
FIG. 1 is a block diagram showing a construction of a radio communicating apparatus (A) according to the first embodiment of the invention.
Figure 2:
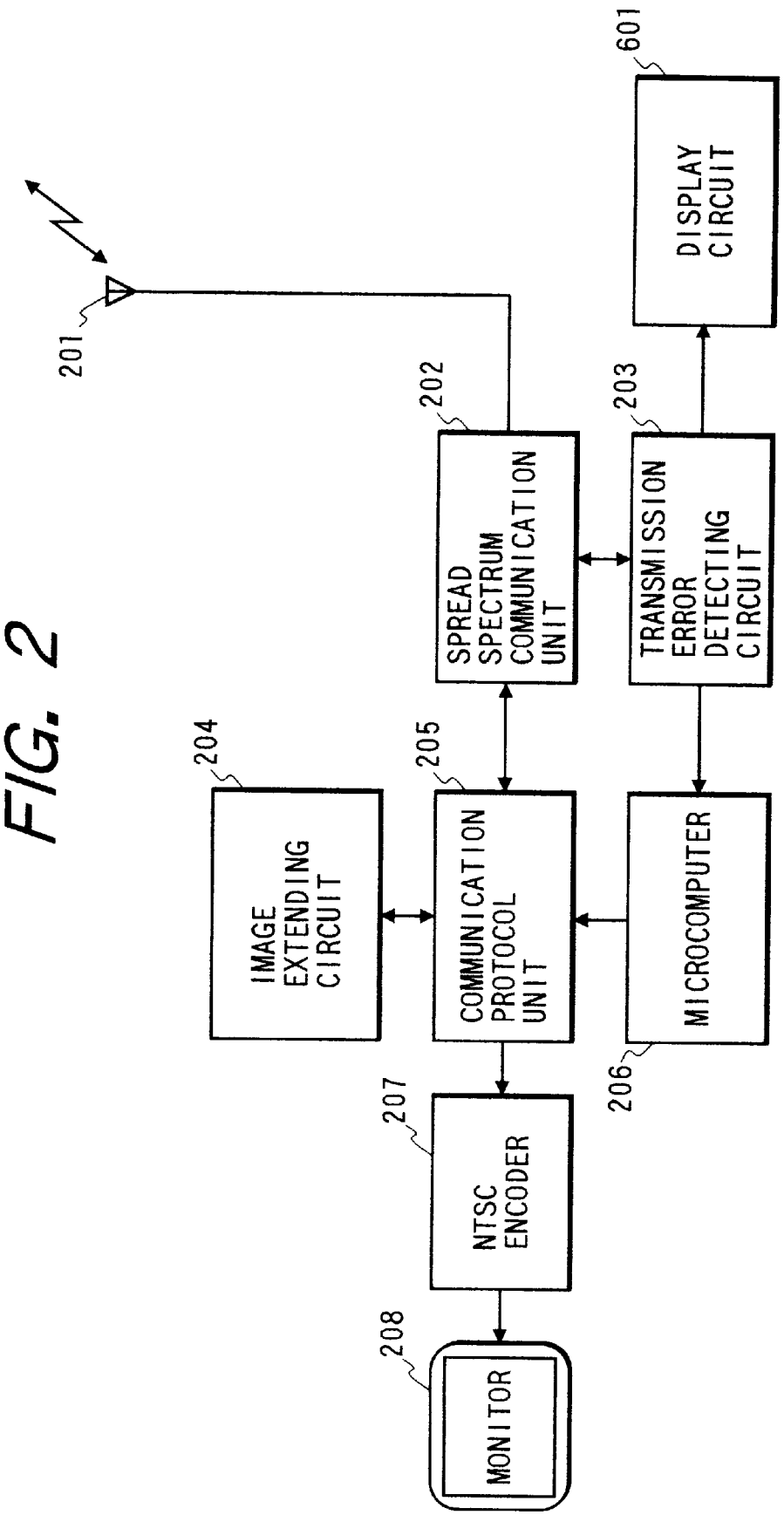
FIG. 2 is a block diagram showing a construction of a radio communicating apparatus (B) according to the first embodiment of the invention.

FIGS. 1 and 2 are block diagrams showing a radio communicating apparatus (A) and a radio communicating apparatus (B) using a spread spectrum communication (code division multiplex) as a first embodiment according to the invention. The radio communicating apparatus (A) of FIG. 1 and the radio communicating apparatus (B) of FIG. 2 bidirectionally execute radio transmissions.

In FIG. 1, reference numeral 101 denotes a lens for receiving an optical image of an object to be photographed; 102 an image pickup element for converting the received optical image of the object into an image pickup signal; 103 a CDS/AGC for sampling and holding the image pickup signal and setting a proper signal level; 104 a digital signal processing circuit for A/D converting an analog image pickup signal outputted from the CDS/AGC 103 and converting it into an image signal of the standard television system such as an NTSC system or the like; 105 an image compression circuit/subsampling circuit; 106 a communication protocol unit for converting a digital image signal which was compressed on a predetermined block unit basis into digital image data of a predetermined unit adapted to be transmitted by the spread spectrum communication system; 107 a microcomputer; 108 a spread spectrum communication unit; 109 a transmission error detecting circuit; and 110 an antenna.

In FIG. 2, reference numeral 201 denotes an antenna; 202 a spread spectrum communication unit for detecting a transmission signal received by the antenna 201; 203 a transmission error detecting circuit; 204 an image extending circuit for extending received image signal data; 205 a communication protocol unit for performing a control to convert the detected signal into the digital image signal before the transmission; 206 a microcomputer; 207 an NTSC encoder for outputting the received digital image signal of the standard television system to a monitor 208; and 208 the monitor.

The operations of the radio communicating apparatuses (A) and (B) constructed as mentioned above will be described hereinbelow.

An optical image of the object captured by the lens 101 in the radio communicating apparatus (A) is converted into a digital image signal of the standard television system such as an NTSC system or the like via the image pickup element 102, CDS/AGS 103, and digital signal processing circuit 104. The digital image signal is subjected to a predetermined image compression encoding process or, in accordance with necessity, a process for reducing the number of frames by the image compression circuit/subsampling circuit 105 in order to reduce an amount of data. The communication protocol unit 106 converts the digital image signal compressed on a predetermined block unit basis into digital image data of a predetermined unit adapted to be transmitted by the spread spectrum system. The digital image data is inputted to the spread spectrum communication unit 108 and is packeted in a predetermined transmission format. After that, the packet data is spread modulated by the code division multiplex and the resultant data is radio transmitted via the antenna 110.

A reception signal received by the antenna 201 in the radio communicating apparatus (B) is reverse spread modulated by the spread spectrum communication unit 202 every digital image data of the predetermined unit and the resultant data is supplied to the communication protocol unit 205. Further, the communication protocol unit 205 performs an extending process to an image signal composed of a plurality of digital image data by using the image extending circuit 204 and outputs the resultant data to the monitor 208 via the NTSC encoder 207.

The reception signal received by the antenna 201 is reverse spread modulated by the spread spectrum communication unit 202 and, after that, the data is inputted every digital image data of the predetermined unit to the transmission error detecting circuit 203. The transmission error detecting circuit 203 detects a transmission error rate by an error detection code added to the reception signal, that is, each digital image data and outputs the detection result (the ratio of the error data detected from the reception signal of the predetermined unit) to the microcomputer 206. The transmission error rate is transmitted as error rate data showing the error rate of the reception signal via the communication protocol unit 205 and spread spectrum communication unit 202 and from the antenna 201 to the radio communicating apparatus (A). The error rate data which is transmitted controls the spread modulating process of the radio communicating apparatus (B), that is, the number of code division multiplexes and also controls the spread modulating process of the radio communicating apparatus (A).

The transmitted error rate data is received by the antenna 110 in the radio communicating apparatus (A) and, after that, it is inputted to the spread spectrum communication unit 108. In the spread spectrum communication unit 108, the transmission error rate of the image data transmitted to the radio communicating apparatus (B) is recognized by the received error rate data. The spread spectrum communication unit 108 consequently discriminates a state of the transmission path and changes the number of channels of the image data which is spread spectrum communicated, thereby enabling an information amount of the transmission signal to be controlled so that a transmission speed and a transmission quality become optimum.

With respect to the transmission data itself transmitted from the spread spectrum communication unit 202 via the antenna 201 as well, the radio communicating apparatus (A) can also detect the transmission error rate of the transmission data by the transmission error detecting circuit 109. That is, the radio communicating apparatus (A) can control the number of channels also by detecting the transmission error rate of the data transmitted from the radio communicating apparatus (B) by the transmission error detecting circuit 109.

According to the embodiment, therefore, by detecting the error rate of the transmission signal in one direction or bidirection, the number of code division multiplexes according to the situation of the transmission path can be set in each radio communicating apparatus. For example, the radio communicating apparatus (A) of the embodiment has a construction such that the number of channels is controlled according to the error rate which was obtained latest between the transmission error rate detected and transmitted by the radio communicating apparatus (B) and the transmission error rate detected by the transmission error detecting circuit 109.

Figure 3:
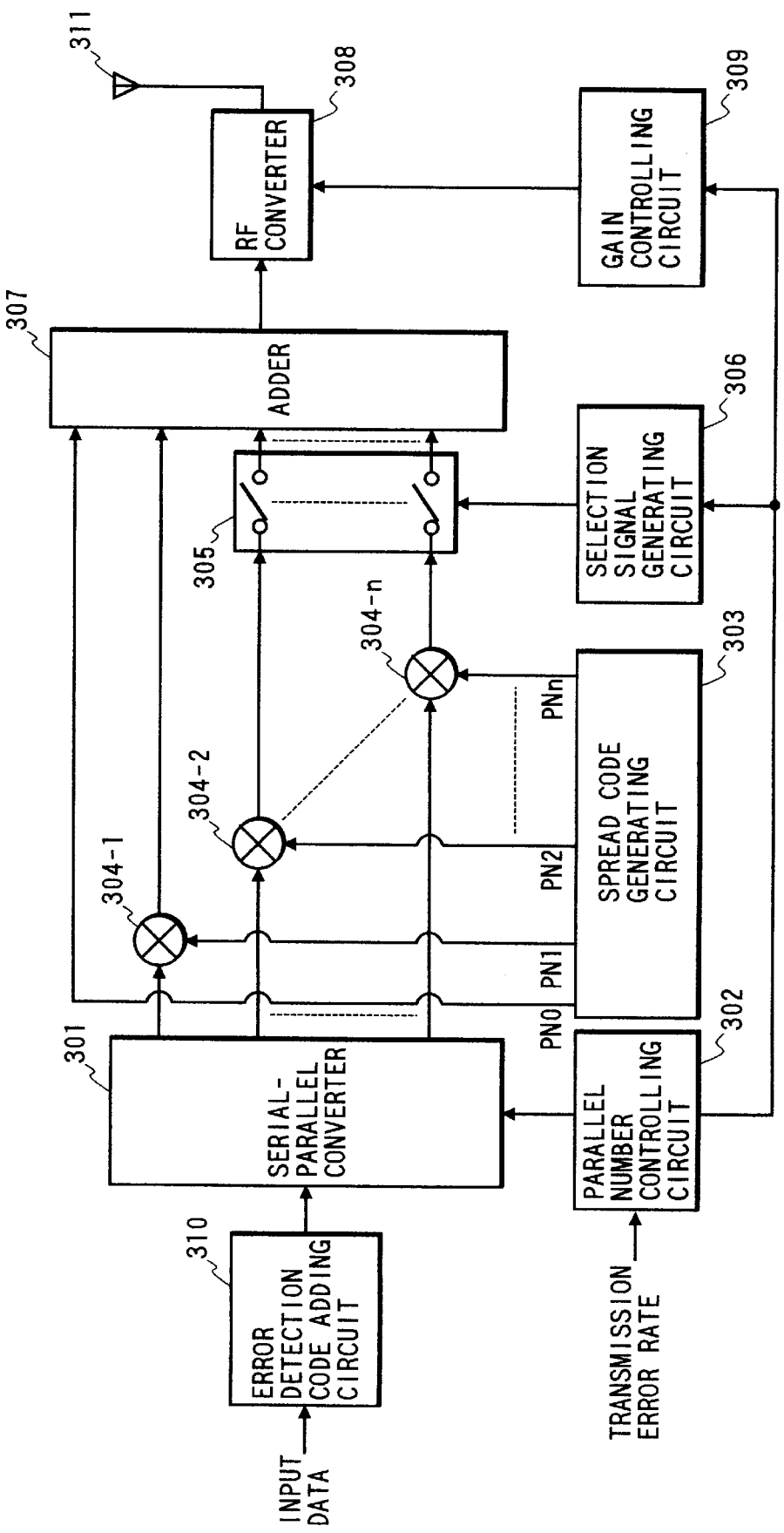
FIG. 3 is a block diagram showing a construction of a transmitting circuit having spread spectrum communication units 108 and 202 in the first embodiment of the invention.
Figure 4:
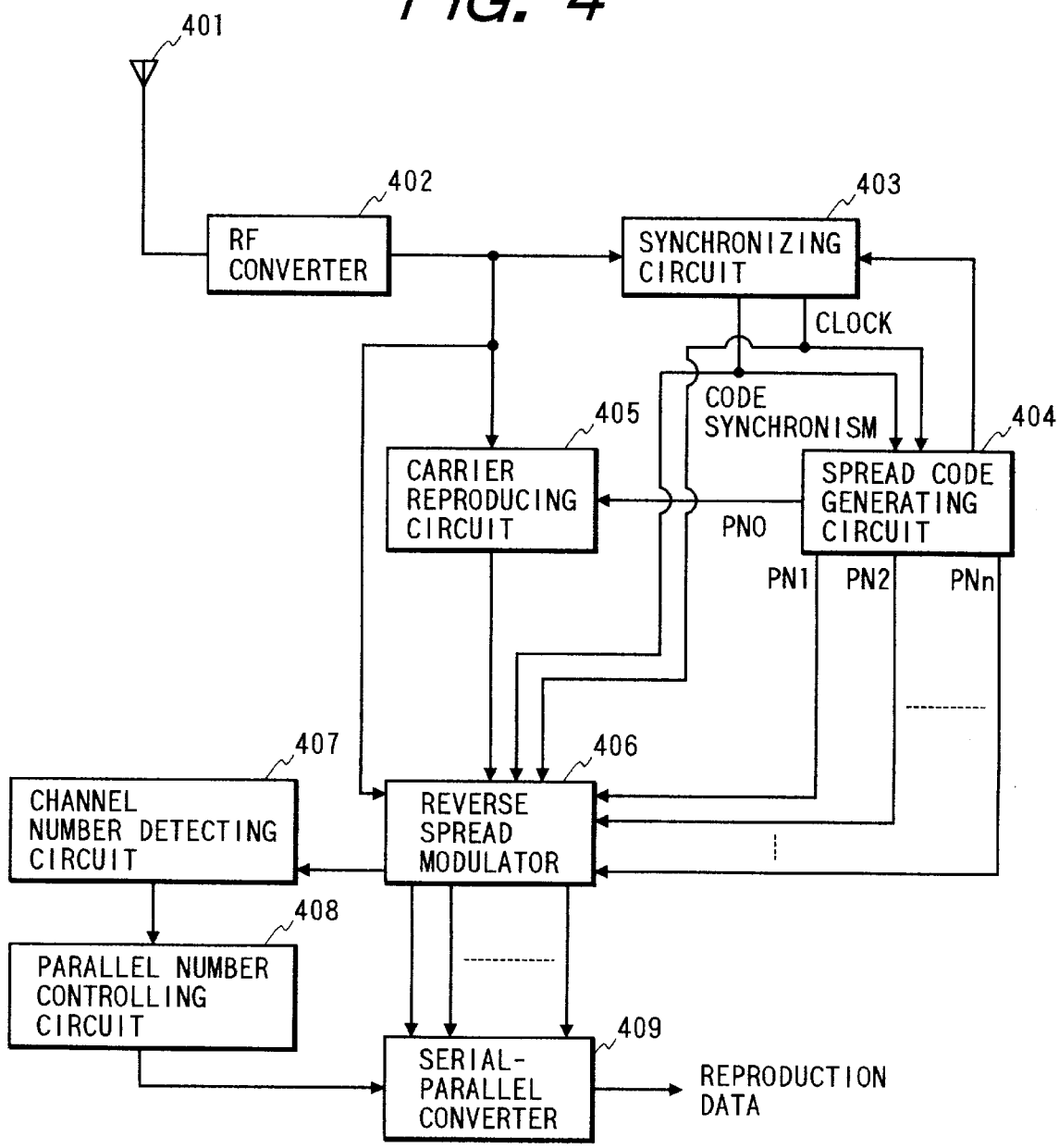
FIG. 4 is a block diagram showing a construction of a receiving circuit having the spread spectrum communication units 108 and 202 in the first embodiment of the invention.

FIG. 3 is a detailed block diagram of a transmitting circuit of each of the spread spectrum communication units 108 and 202. FIG. 4 is a detailed block diagram of a receiving circuit of each of the spread spectrum communication units 108 and 202.

In FIG. 3, reference numeral 301 denotes a serial-parallel converter for dividing input data (for example, image data which was compression coded on a block unit basis) which is serially inputted on a predetermined block unit basis into (m) (m≦n) parallel data and converting the data into (n) parallel data including the (m) parallel data and (n−m) dummy data; 302 a parallel number controlling circuit for calculating the number (m) of code division multiplexes (hereinbelow, referred to as a multiplex number m) by an output from the transmission error detecting circuit 109 or 203 or the transmission error rate data of the transmission signal transmitted and for controlling the serial-parallel converter 301, a selection signal generating circuit 306, and a gain controlling circuit 309 in accordance with the calculation result; 303 a spread code generating circuit for generating (n) different spread code series (PN1 to PNn) and a synchronism dedicated spread code series PN0; 304-1 to 304-n multipliers for multiplying the (n) parallel data. by the (n) spread code series (PN1 to PNn); 305 a switch for selecting (n−1) outputs of the multipliers; 304-2 to 304-n in accordance with the multiplex number (m); 306 the selection signal generating circuit for controlling the switch 305 in accordance with the multiplex number (m); 307 an adder for adding the synchronism dedicated spread code PN0 and outputs of the multipliers 304-1 to 304-n; 308 a radio frequency (RF) converter for converting an output of the adder 307 into a radio transmission frequency; 309 the gain controlling circuit for controlling an output of a signal which is transmitted from the RF converter 308 in accordance with the multiplex number (m); 310 an error detection code adding circuit for adding a detection code for error detection to input data of a predetermined block unit; and 311 an antenna.

In FIG. 4, reference numeral 401 denotes an antenna; 402 a radio frequency (RF) converter; 403 a synchronizing circuit for compensating and maintaining a synchronism for the spread code series and clocks on the transmission side; 404 a spread code generating circuit for generating the same spread code series as those on the transmission side by the code synchronism and clock signals generated by the synchronizing circuit 403; 405 a carrier reproducing circuit for reproducing a carrier signal from a spread code for carrier reproduction which is outputted from the spread. code generating circuit 404; 406 a reverse spread modulator for executing a reverse spread modulating process to the (m) (m≦n) parallel data which was spread modulated; 407 a channel number detecting circuit for detecting the number of channels from an output of the reverse spread modulator 406; 408 a parallel number controlling circuit for controlling a parallel-serial converter 409 in accordance with an output of the channel number detecting circuit 407; and 409 the parallel-serial converter for selecting the necessary (m) parallel data from the (n) parallel data outputted from the reverse spread modulator 406 in accordance with an output of the parallel number controlling circuit 408 and for converting them into a serial data train.

The operations of the transmitting circuit and receiving circuit of the spread spectrum communication units 108 and 202 constructed as mentioned above will be described hereinbelow.

In FIG. 3, the input data of the predetermined block unit is inputted to the error detection code adding circuit 310 and is added with a detection code for error detection. The parallel number controlling circuit 302 determines the number (m) (m≦n) of code division multiplexes of the input data to which the error detection code was added from outputs of the transmission error detecting circuits 109 and 203 or the transmission error rate of the transmission signal recognized by the error rate data mentioned above. The serial-parallel converter 301 divides the input data into (m) data in accordance with the code division multiplex number (m) and forms (n) parallel data including the input data divided into the (m) data. (n−m) data among the (n) parallel data is dummy data.

The spread code generating circuit 303 generates (n+1) different spread codes PN0 to PNn having the same code period. Among the codes, PN0 is the code only for the synchronization and carrier reproduction and is directly inputted to the adder 307. The rest (n) spread code series PN1 to PNn are spread modulated with the (m) parallel data outputted from the serial-parallel converter 301 by the (n) multipliers 304-1 to 304-n.

Among the (n) spread modulated data, necessary data is only (m) data [that is, the (n−m) dummy data is unnecessary]. The selection signal generating circuit 306, therefore, selects the (m) data by using the switch 305. The selected (m) signals are inputted to the adder 307 together with PN0 as a synchronism dedicated signal and are multiplexed.

The adder 307 linearly adds the inputted (m+1) signals [(m) spread modulated signals and the synchronism dedicated signal PN0], outputs a baseband signal, and inputs it to the RF converter 308. The RF converter 308 converts the baseband signal to a high frequency signal having a proper center frequency and transmits it by the antenna 311.

In FIG. 4, a reception signal received by the antenna 401 is properly filtered and amplified by the RF converter 402 and is converted into a proper intermediate frequency band signal, and the signal is outputted. The reception signal is inputted to the synchronizing circuit 403. In the synchronizing circuit 403, synchronization of the spread code series and the synchronization of the clock for the reception signal are established and the code synchronism and clock signals are outputted to the spread code generating circuit 404.

After the synchronization was established by the synchronizing circuit 403, the spread code generating circuit 404 generates a clock and a plurality of spread code series in which phases of the code series coincide for the plurality of spread code series on the transmission side. Among the plurality of spread codes, the synchronism dedicated spread code PN0 is inputted to the carrier reproducing circuit 405. The carrier reproducing circuit 405 reproduces a carrier wave of the intermediate frequency band as an output of the RF converter 402 by the synchronism dedicated spread code PN0.

The reproduced carrier wave is supplied together with the output of the RF converter 402 to the reverse spread modulator 406 and a baseband signal is generated. The baseband signal is reverse spread modulated every spread code series by the (n) spread code series PN1 to PNn generated by the spread code generating circuit 404, thereby obtaining (n) parallel data. The reverse spread modulator 406 stores a correlation value of the products of one period of the (n) spread code series and the reception signal into the channel number detecting circuit 407.

In the channel number detecting circuit 407, when an absolute value of the correlation value of each channel is equal to or smaller than a predetermined value, it is determined that the data is not transmitted by the channel. That is, the number of channels in each of which the absolute value of the correlation value is equal to or larger than the predetermined value is counted. A count value is outputted as a multiplex number (m) to the parallel number controlling circuit 408. The parallel number controlling circuit 408 controls the parallel number of the parallel-serial converter 409 in accordance with the inputted multiplex number (m). That is, in the parallel-serial converter 409, the parallel number is set by the parallel number controlling circuit 408, only the (m) valid data among the (n) parallel data demodulated by the reverse spread modulator 406 is converted into serial data and the serial data is outputted. The outputted reproduction data is inputted to the transmission error detecting circuit 203 and communication protocol unit 205 shown in FIG. 2. The error rate of the transmitted data is detected by the transmission error detecting circuit 203.

As mentioned above, according to the first embodiment of the invention, the transmission error rate of the reception signal is detected on the reception side and the detection result is transmitted to the transmission side. When the detection result shows a high error rate, it is determined that the transmission state is bad, thereby controlling so as to reduce the number of channels. Thus, an influence by multipath fading is eliminated. Even if the transmission data amount is decreased, a preferable radio transmission corresponding to the transmitting situation can be performed.

According to the invention, by providing the transmission error detecting circuits for both of the transmission and reception sides, similar processes can be executed on both of the transmission and reception sides, so that a preferable radio transmission immediately corresponding to the error state can be performed.

(Second embodiment)

Figure 5:
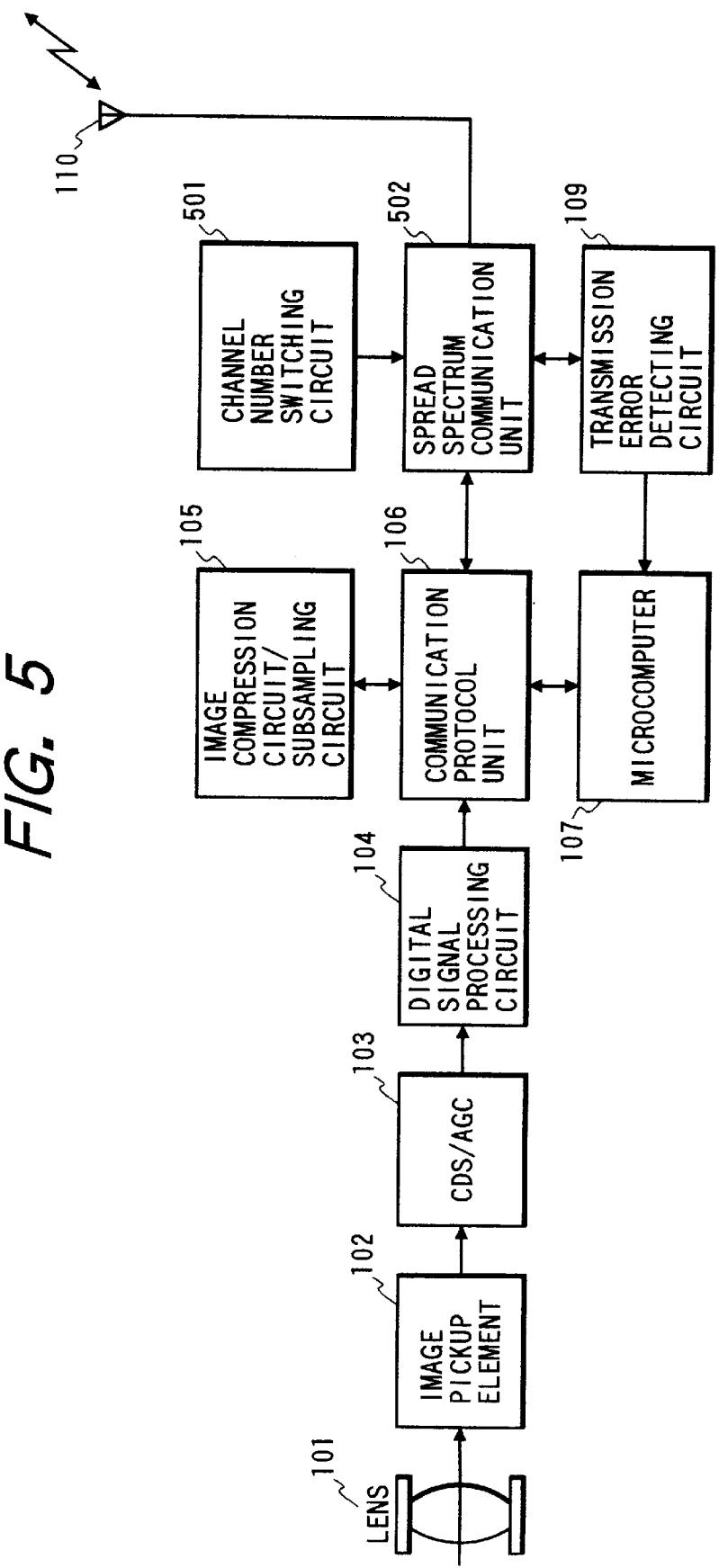
FIG. 5 is a block diagram showing a construction of a radio communicating apparatus (A) according to the second embodiment of the invention.
Figure 6:
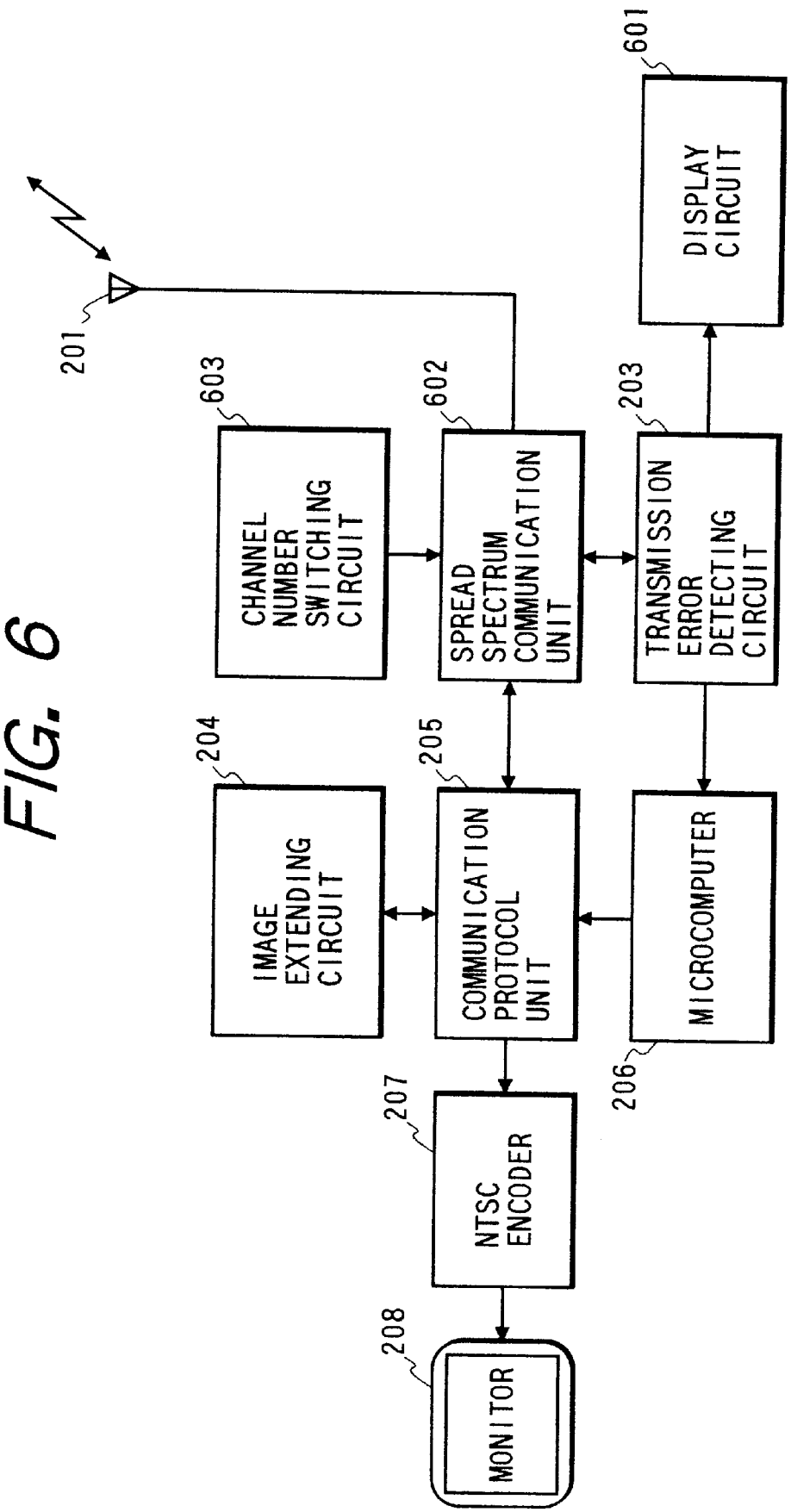
FIG. 6 is a block diagram showing a construction of a radio communicating apparatus (B) according to the second embodiment of the invention.

FIGS. 5 and 6 are block diagrams showing radio communicating apparatuses (A) and (B) using the spread spectrum communication (code division multiplex) as a second embodiment according to the invention. The radio communicating apparatus (A) of FIG. 5 and the radio communicating apparatus (B) of FIG. 6 bidirectionally execute radio transmissions.

In the second embodiment, the component elements which are the same as or correspond to those in the first embodiment are designated by the same reference numerals and their detailed descriptions are omitted.

In FIG. 5, reference numeral 501 denotes a channel number switching circuit and 502 indicates a spread spectrum communication unit.

In FIG. 6, reference numeral 601 denotes a display circuit, 602 a spread spectrum communication unit, and 603 a channel number switching circuit.

The operations of the radio communicating apparatuses (A) and (B) constructed as mentioned above will now be described hereinbelow.

In a manner similar to the first embodiment, an information signal which was spread spectrum modulated and which uses the code division multiplex is transmitted through the spread spectrum communication unit 108 and antenna 110 of the radio communicating apparatus (A). The transmitted information signal is received by the antenna 201 of the radio communicating apparatus (B) and is inputted to the spread spectrum communication unit 202. As described in the first embodiment, the radio communicating apparatus (B) demodulates (reverse spread modulates) the received signal and supplies the demodulated signal to the transmission error detecting circuit 203. The transmission error detecting circuit 203 detects a transmission error rate by using an error detection code added to the reception data. The detection result is displayed by the display circuit 601 by various display methods. In the case where the information signal received by the radio communicating apparatus (B) is the error rate data detected by the radio communicating apparatus (A), the error rate data is displayed by the display circuit 601 through the transmission error detecting circuit 203. Thus, information indicative of the error rate of the transmission signal which was obtained latest is displayed on the display circuit 601.

The display circuit 601 has a display circuit such as CRT monitor, liquid crystal panel, or the like. The same device as the monitor 208 can be also used as a display circuit 601. The user can judge a transmitting situation by the error rate information that is displayed by the display circuit 601. For example, when a transmitting situation is bad, the number (m) of code division multiplexes (multiplex number) which is set in the radio communicating apparatus (A) or (B) by the channel number switching circuit 501 or 603 is reduced and an information amount of the transmission signal can be manually set so that it is preferable for the user.

That is, in the second embodiment of the invention, the user can discriminate a transmitting situation by the error rate information which is displayed on the display apparatus. Thus, by using external change-over switches such as channel number switching circuits 501 and 603, the user himself can control the multiplex number. A transmitting state can be also set so that it is preferable to the user.

According to the embodiments as described above, the modulating process of the information signal which is outputted is controlled by the error rate of the signal which was transmitted in the past, so that the optimum data transmission of a low error rate in the situation of the transmission path can be performed.

According to the embodiments, the transmission side and the reception side recognize situations of the transmission paths and control the modulating process of the information signal which is transmitted, respectively, so that the optimum data transmission can be performed in a real-time manner.

According to the embodiments, the situation of the transmission path when the information signal is transmitted is discriminated in accordance with the error rate of the transmitted information signal and the multiplex number of the information signal to be transmitted is variably controlled in accordance with the discrimination result, so that the optimum data transmission of a low error rate can be performed.

According to the embodiments, by displaying the information indicative of the situation of the transmission path to the user, the user can visually judge the situation of the transmission path, so that the transmission speed and transmission quality which are optimum to the user can be set.

The invention may be embodied in other specific forms without departing from the spirit or essential characteristics thereof.

For example, the embodiments have been described with respect to the system for spread spectrum communicating the image information between the radio communicating apparatus (A) having the image pickup unit to form image information and the radio communicating apparatus (B) having the monitor unit which can display the image information. However, even in a system such that a plurality of such two radio communicating apparatuses exist, a radio communication having a function similar to that of the present invention can be performed.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all of the modifications and changes belonging to equivalents of the claims are considered to fall within the scope of the present invention.

What is claimed is:

1. An information signal communicating apparatus comprising:

(a) receiving means for receiving a signal transmitted from an outside;

(b) detecting means for detecting an error state of the reception signal received by said receiving means;

(c) modulating means for modulating an information signal in accordance with a detection result of said detecting means; and (d) output means for outputting the information signal modulated by said modulating means.

2. An apparatus according to claim 1, wherein said modulating means includes dividing means for dividing said information signal into one or more information signal trains, and said modulating means modulates each of said one or more information signal trains divided by said dividing means.

3. An apparatus according to claim 2, wherein said modulating means includes forming means for forming one or more different code series, and said modulating means modulates each of said one or more information signal trains divided by said dividing means by using said one or more code series formed by said forming means.

4. An apparatus according to claim 3, wherein said modulating means multiplexes said one or more information signal trains modulated by using said one or more different code series.

5. An apparatus according to claim 3, wherein said modulating means further includes setting means for setting the number of said information signal trains which are divided by said dividing means and the number of said code series which are formed by said forming means in accordance with a manual operation.

6. An apparatus according to claim 1, wherein said detecting means detects an error state of said reception signal by using an error detection code added to said reception signal.

7. An apparatus according to claim 1, wherein said modulating means spread spectrum modulates said information signal by using a code division multiplex.

8. An apparatus according to claim 7, wherein said output means radio transmits the information signal modulated by said modulating means.

9. An apparatus according to claim 1, wherein said reception signal includes the image information formed by an image pickup apparatus, and said image pickup apparatus photographs an optical image of an object to be photographed and forms image information from said photographed signal.

10. An apparatus according to claim 9, wherein said detecting means detects an error state of said reception signal by using an error detection code added to said reception signal.

11. An apparatus according to claim 1, wherein said output means can also output error information showing the error state of said reception signal.

12. An apparatus according to claim 11, wherein said error information is outputted to a transmitting source of said reception signal.

13. An apparatus according to claim 1, further comprising:

display means for displaying the error state detected by said detecting means.

14. An information signal communicating apparatus comprising:

(a) receiving means for receiving a signal to which an error detection code is added;

(b) detecting means for detecting an error rate of the signal received by said receiving means by using said error detection code;

(c) modulating means for modulating an information signal; and (d) control means for controlling a modulating process of said modulating means in accordance with a detection result of said detecting means.

15. An apparatus according to claim 14, wherein said modulating means includes dividing means for dividing said information signal into one or more information signal trains and forming means for forming one or more different code series, and said modulating means modulates each of said one or more information signal trains by using said one or more different code series.

16. An apparatus according to claim 15, wherein said modulating means multiplexes each of said one or more information signal trains modulated by using said one or more different code series.

17. An apparatus according to claim 15, wherein said control means controls the number of said information signal trains which are divided by said dividing means and the number of said code series which are formed by said forming means in accordance with a detection result of said detecting means.

18. An apparatus according to claim 14, further comprising:

transmitting means for radio transmitting the information signal modulated by said modulating means, and wherein said transmitting means can also transmit error information showing the error rate detected by said detecting means.

19. An apparatus according to claim 18, wherein said error information is transmitted to a transmitting source of the signal received by said receiving means.

20. An apparatus according to claim 19, wherein said signal received by said receiving means includes the image information formed by an image pickup apparatus, and said image pickup apparatus photographs an optical image of an object to be photographed and forms image information from said photographed signal.

21. An information signal communicating apparatus comprising:

(a) modulating means for modulating an information signal;

(b) output means for outputting the information signal modulated by said modulating means;

(c) receiving means for receiving external error information; and (d) control means for controlling a modulating process of said modulating means in accordance with the error information received by said receiving means.

22. An apparatus according to claim 21, wherein said modulating means includes dividing means for dividing said information signal into one or more information signal trains and forming means for forming one or more different code trains, and said modulating means modulates each of said one or more information signal trains by using said one or more different code trains.

23. An apparatus according to claim 22, wherein said modulating means multiplexes said one or more information signal trains modulated by using said one or more different code series.

24. An apparatus according to claim 22, wherein said control means controls the number of said information signal trains which are divided by said dividing means and the number of said code series which are formed by said forming means in accordance with said error information.

25. An apparatus according to claim 24, wherein said control means further includes setting means for setting the number of said information signal trains which are divided by said dividing means and the number of said code series which are formed by said forming means in accordance with a manual operation.

26. An apparatus according to claim 21, wherein said modulating means spread spectrum modulates said information signal by using a code division multiplex.

27. An apparatus according to claim 26, wherein said output means radio transmits the information signal modulated by said modulating means.

28. An apparatus according to claim 21, further comprising:

an image pickup apparatus for photographing an optical image of an object to be photographed and forming image information from said image pickup signal, and wherein said information signal includes the image information formed by said image pickup apparatus.

29. An apparatus according to claim 21, wherein said error information is information showing an error rate of the information signal outputted from said output means.

30. An apparatus according to claim 29, wherein said error information is detected by an error detection code included in said information signal.

31. An apparatus according to claim 21, further comprising:

display means for displaying an error state received by said receiving means.

32. An information signal communicating apparatus comprising:

(a) dividing means for dividing an inputted information signal into one or more data trains;

(b) forming means for forming one or more different code series;

(c) modulating means for modulating each of said one or more data trains by using said one or more different code trains;

(d) detecting means for detecting a transmitting situation by an error state of a signal which was transmitted in the past; and (e) control means for controlling the number of divisions of said dividing means in accordance with a detection result of said detecting means.

33. An information signal communicating apparatus comprising:

(a) receiving means for receiving an information signal which was modulation processed in accordance with an error state of a signal which was transmitted in the past;

(b) discriminating means for discriminating the modulating process of the information signal received by said receiving means; and (c) demodulating means for demodulating said information signal in accordance with a discrimination result of said discriminating means.

34. An information signal communication system comprising:

(a) receiving means for receiving a signal transmitted from an outside;

(b) detecting means for detecting an error state of the signal received by said receiving means;

(c) transmitting means for transmitting error information indicative of the error state detected by said detecting means; and (d) modulating means for modulating an information signal in accordance with the error information transmitted by said transmitting means.

35. An information signal communicating method comprising:

(a) a receiving step of receiving a signal transmitted from an outside;

(b) a detecting step of detecting an error state of the reception signal received in said receiving step;

(c) a modulating step of modulating an information signal in accordance with a detection result obtained in said detecting step; and (d) an output step of outputting the information signal modulated in said modulating step.

36. An information signal communicating method comprising:

(a) a receiving step of receiving a signal to which an error detection code is added;

(b) a detecting step of detecting an error rate of the signal received in said receiving step by using said error detection code;

(c) a modulating step of modulating an information signal; and (d) a control step of controlling a modulating process in said modulating step in accordance with a detection result obtained in said detecting step.

37. An information signal communicating method comprising:

(a) a modulating step of modulating an information signal;

(b) an output step of outputting an information signal modulated in said modulating step;

(c) a receiving step of receiving external error information; and (d) control means for controlling a modulating process in said modulating step in accordance with error information received in said receiving step.

38. An information signal communicating method comprising:

(a) a dividing step of dividing an inputted information signal into one or more data trains;

(b) a forming step of forming one or more different code series;

(c) a modulating step of modulating each of said one or more data trains by using said one or more different code series;

(d) a detecting step of detecting a transmitting situation by an error state of a signal which was transmitted in the past; and (e) a control step of controlling the number of divisions in said dividing step in accordance with a detection result obtained in said detecting step.

39. An information signal communicating method comprising:

(a) a receiving step of receiving an information signal which was modulation processed in accordance with an error state of a signal which was transmitted in the past;

(b) a discriminating step of discriminating the modulating process of the information signal received in said receiving step; and (c) a demodulating step of demodulating said information signal in accordance with a discrimination result obtained in said discriminating step.

* * * * *

UNITED STATES PATENT AND TRADEMARK OFFICE
CERTIFICATE OF CORRECTION

PATENT NO. : 6,118,774
DATED : September 12, 2000
INVENTOR(S) : HIDEYUKI ARAI ET AL.

It is certified that error appears in the above-identified patent and that said Letters Patent is hereby corrected as shown below:

ON THE COVER PAGE

Under Column [75] Inventors, "Masamine Maedda," should read --Masamine Maeda,--.

COLUMN 13

Line 2, "sa id" should read --said--.

COLUMN 6

Line 58, "data." should read --data--.

Signed and Sealed this

First Day of May, 2001

Attest:

NICHOLAS P. GODICI

Attesting Officer    Acting Director of the United States Patent and Trademark Office